Oct. 11, 1960     G. M. ILLICH, JR., ET AL     2,955,926
HIGH PRESSURE CHEMICAL APPARATUS
Original Filed Sept. 20, 1954     3 Sheets-Sheet 1

Inventors
George M. Illich, Jr.
Ralph M. Robinson
By William E. Dominick
Attorney Oct. 11, 1960 G. M. ILLICH, JR., ET AL 2,955,926
HIGH PRESSURE CHEMICAL APPARATUS
Original Filed Sept. 20, 1954 3 Sheets-Sheet 2

Inventor
George M. Illich, Jr.
Ralph M. Robinson
By William E. Dominick
Attorney

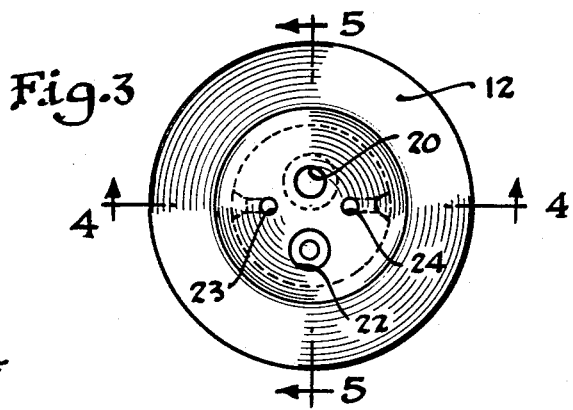
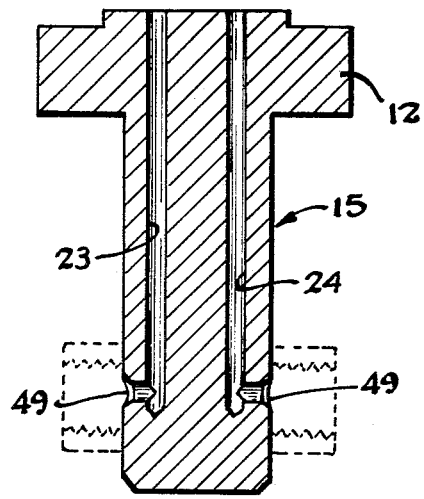
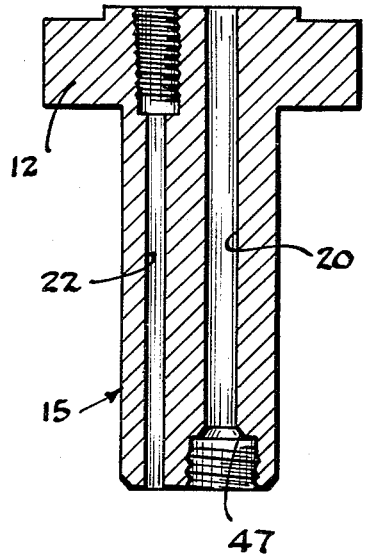
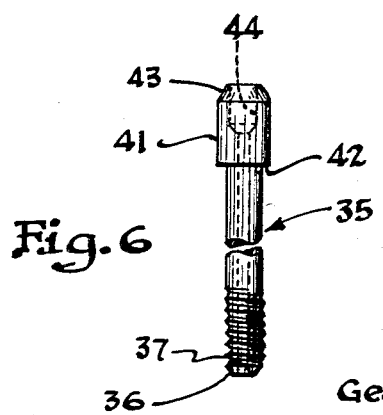
Inventor
George M. Illich, Jr.
Ralph M. Robinson
By William E. Dominick
Attorney

United States Patent Office 2,955,926
Patented Oct. 11, 1960

2,955,926
HIGH PRESSURE CHEMICAL APPARATUS

George M. Illich, Jr., Lake Forest, and Ralph M. Robinson, Chicago, Ill., assignors to Abbott Laboratories, Chicago, Ill., a corporation of Illinois Original application Sept. 20, 1954, Ser. No. 457,020, now Patent No. 2,822,392, dated Feb. 4, 1958. Divided and this application Jan. 31, 1958, Ser. No. 712,434

1 Claim. (Cl. 23—289)

This invention relates to an improved apparatus for carrying out chemical reactions and more particularly to an improved high pressure reaction apparatus.

It is known that aromatic nitrogen compounds having the nitrogen atom directly attached to an aromatic carbon atom can be hydrogenated to the corresponding amino cyclic compound with such catalysts as nickel, osmium, iridium, and more recently with ruthenium (2,606,925, Whitman). When attempting to catalytically hydrogenate aromatic nitrogen compounds of the above type, such as aniline, having an amino group directly attached to an aromatic carbon atom, it was found that the temperature of the reaction mixture during the initial stage of the reaction rises very rapidly causing deamination and greatly increasing the formation of undesirable side reaction products. The foregoing undesirable results are particularly evident when attempts are made to continuously catalytically hydrogenate an aromatic amino compound of the above type with a ruthenium catalyst.

It is therefore an object of the present invention to provide an improved apparatus and more economical method of catalytically hydrogenating aromatic compounds having a nitrogen atom directly attached to a carbon atom of the aromatic ring.

Another object of the invention is to provide an improved continuous process of catalytically hydrogenating aromatic compounds having a nitrogen atom attached directly to a carbon atom of the aromatic ring.

A still further object of the invention is to provide an improved continuous countercurrent method of catalytically hydrogenating aromatic amino compounds to form the corresponding alicyclic amino compounds.

Still another object of the present invention is to provide a more economical method of catalytically hydrogenating aniline to cyclohexylamine.

Other objects of the invention will be apparent from the detailed description and claim to follow.

The foregoing objects and advantages of the present invention will be better understood by reference to the following specification when read in conjunction with the accompanying drawing wherein:

Figure 3 is a top view of the bottom end closure of the reactor shown in Figure 2;

Figure 4 is a vertical sectional view along the line 4—4 of Figure 3;

Figure 5 is a vertical sectional view along the line 5—5 of Figure 3;

Figure 6 is a side elevation view of the tubular adapter member shown in Figure 2.

Figure 1:
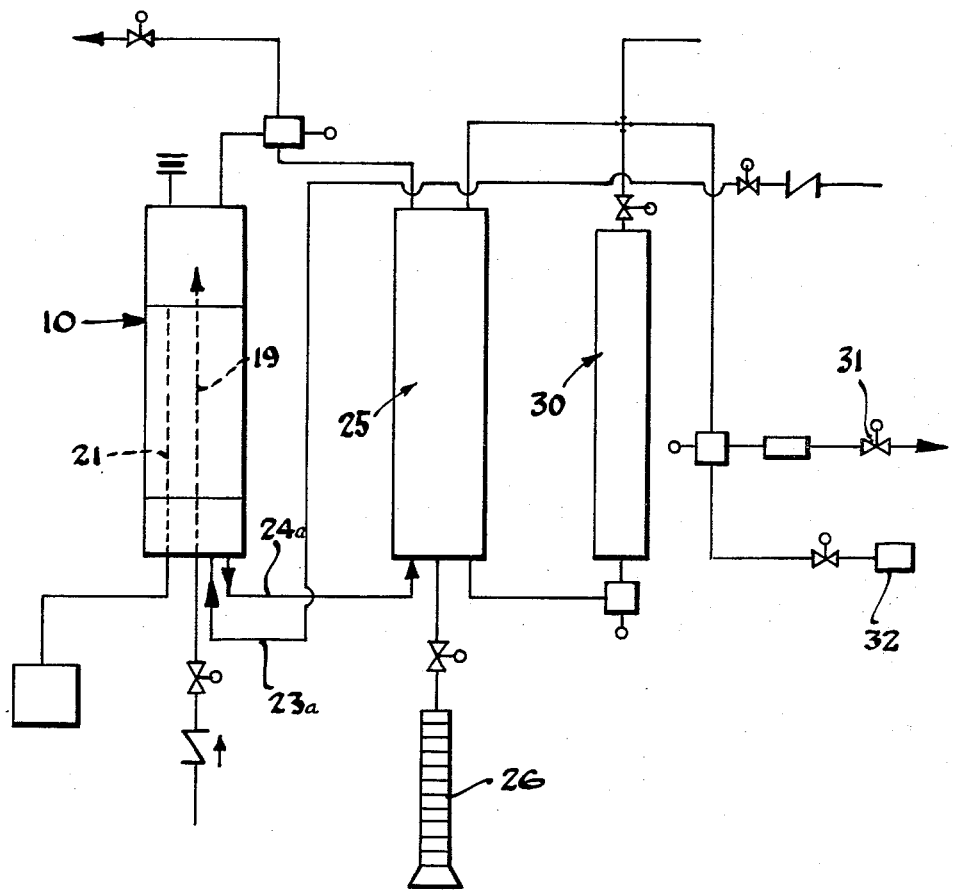
Figure 1 is a schematic diagram showing the flow sheet of the herein disclosed process.
Figure 2:
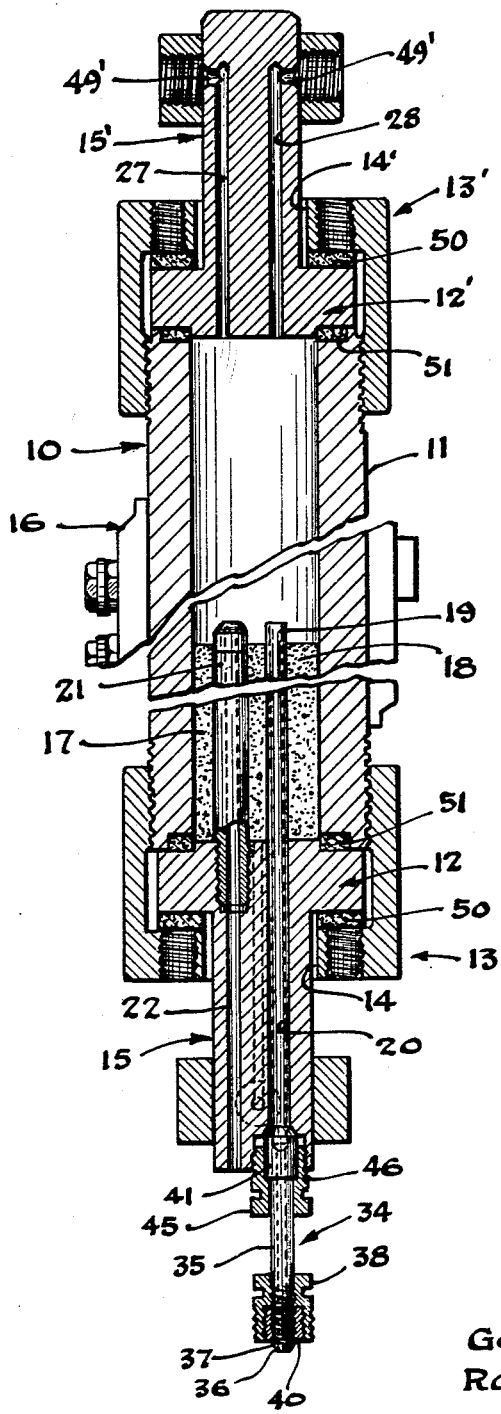
Figure 2 is a vertical sectional view of the high pressure reactor.

It has been discovered that the foregoing and other objects of the invention are achieved by continuously reacting under super-atmospheric pressure hydrogen and an aromatic amino compound containing a nitrogen atom directly attached to an aromatic carbon atom in a reaction zone containing a ruthenium catalyst maintained at a temperature between about 200° C. and about 250° C. and preferably admixing with the nitrogen compound a minor proportion of a compound having an amine group therein which is normally present in the equilibrium reaction mixture. By bringing the several above-specified reactants together under the herein specified conditions, it is possible to produce continuously in a controlled manner without continuously heating the reaction zone very substantial volumes of a hydrogenated aromatic nitrogen compound with high yields and a minimum amount of side reaction products. In contrast with the batch-wise catalytic hydrogenation of the said aromatic nitrogen compounds, the hydrogenation reaction when practiced in accordance with the present invention proceeds smoothly without any rapid rise in temperature or localized heating, and proceeds at a rate sufficiently rapid to permit continuous flow through a reaction zone.

An important part of the improved continuous process of the present invention is the inclusion in the reaction mixture of a minor proportion up to about 20 volume percent of a di-alicyclic amino compound or between about 1.5 and 3% by volume of $NH_3$ which compounds are normally present in the equilibrium reaction mixture but which at the elevated reaction temperatures employed in the present process become components in the continuous process when employing a ruthenium catalyst.

A further important contribution of the present invention involves introducing the nitrogen containing compounds and the hydrogen into the reaction zone countercurrently so as to permit increasing the operating pressure whereby increased yields of the desired alicyclic amino compound are obtained.

The process of the present invention is particularly useful for the preparation of cyclohexylamine by continuously catalytically hydrogenating aniline. In carrying out the preferred embodiment of the present invention a continuous reaction tube suitable for withstanding substantial internal pressure and elevated temperatures and containing a suitable ruthenium catalyst is charged with the aromatic nitrogen compounds, which are preferably preheated, and hydrogen so that countercurrent flow is effected under super-atmospheric pressure, preferably at a pressure in excess of about 500 p.s.i. and at a temperature of about 200 and 250° C. and preferably at a temperature of about 220° C.

While the process of the present invention can be carried out by employing a variety of apparatus familiar to those skilled in the art, it is possible to conveniently effect the high pressure reaction of the present invention described in the specific examples by using the apparatus shown in the accompanying drawing which comprises a high pressure reactor 10 consisting of a stainless steel tube 11 having an internal diameter of about 1.5" and a length of about 36" fitted with stainless steel end closures 12, 12' and screw cap fittings 13, 13' each having an axial opening 14, 14' therethrough for accommodating the outwardly extending shank portion 15, 15' of the end closures. A strip heater 16 controlled by a variable transformer (not shown) is mounted on the reactor tube 11 to provide the heat necessary to initiate the reaction. The reaction tube is packed to the 6" level with ¼" Raschig rings 17, and a bed 18 inches deep of a catalyst 18 comprised preferably of 0.5% ruthenium in reduced form on ⅛ inch activated alumina pellets (Baker & Co.) is placed on top of the Raschig rings 17. A total of 462 grams of catalyst occupies 500 cc. volume within the reaction tube and corresponds to 2.31 grams of ruthenium metal. A stainless steel regenerative heat exchanger bayonet type tube 19 having an external diameter of about ¼" extends through a passage 20 in bottom end closure 12 upwardly through the Raschig ring supporting bed and the catalyst bed to a level about 1" above the catalyst bed. A thermowell tube 21 communicates with a passage 22 in the end closure 12 from the bottom to about the top of the catalyst bed. A suitable inlet passageway 23a communicates with passage 23 which is provided through the end closure 12 to convey hydrogen into the reactor tube and a discharge passageway 24a communicates at one end with passage 24 which extends through the end closure 12 and communicates at the other end with a product separator 25 into which the reaction product is conveyed and from which the product is withdrawn into a product receiver 26. The gaseous products are vented and excess pressure within the reactor controlled by providing outlet passages 27 and 28 in top end closure 12' for connection with a gas relief valve and pressure control device, respectively. The body section of the separator 25 is a duplicate of the reactor tube. The separator is also provided with an armored sight glass chamber 30. A pneumatically controlled valve 31 is connected to the vapor phase of the separator through which the vapors can be purged. A vacuum pump 32 is also preferably connected into the system to remove air before pressurizing the system with hydrogen. The reactor is provided with suitable high tension steel thrust rings 50 and gaskets 51. The system is also provided with rupture discs and relief valves to protect the reactor from excess pressure and check valves are placed in appropriate positions to prevent back flow of the reactants. A temperature recorder and a pressure transmitter, controller and recorder, are also provided to enable the apparatus to be operated completely by remote control.

The regenerative heat exchanger bayonet type tube 19 is removably held in sealing engagement within the end closure 12 and is connected with a feed line by means of a high pressure sealing adapter assembly 34 which comprises a tubular adapter member 35 having an axial passage therethrough provided with a conically tapered end surface 36 and having external left-handed threads 37 immediately adjacent said end surface 36. An externally threaded gland nut 38 engages the tubular adapter member 35 and a collar 40 mounted on threads 37, the said external threads of the gland nut being adapted to engage in a threaded connection secured to the feed line. At the opposite end of the tubular member 35 is an integral adapter 41 having a shoulder portion 42 at its inner end and an inwardly tapered portion 43 at its outer end. The adapter 41 also has an enlarged opening 44 at its outer end suitable for receiving therein the end of the regenerative heat exchanger tube 19. A gland nut 45 having external threads 46 thereon fits over the adapter 41 and engages the shoulder portion 42. When the gland nut 45 is threaded into the end closure 12 which has an internally threaded tapered seat portion 47, the tapered portion 43 of the adapter 41 is forced inwardly and sealably engages the regenerative heat exchanger tube 19 holding it firmly in position in the end closure 12. A sealing connection between the inlet passage 23 and the product discharge passage 24 as well as for passages 27 and 28 each of which has a tapered seat 49 and 49', respectively, is provided in each instance by using a gland nut and collar which functions in a manner similar to that of gland nut 38 and collar 40 which connects the reactor with the feed line.

It is obvious that the foregoing adapter assembly can also be used for connecting any tubular member to any fluid reactor vessel for the removal of product, for the introduction of heating or cooling media into the reactor, or for providing a thermowell or sampling connection with the reactor vessel. The assembly is particularly useful in providing a sealing connection which can be easily removed without disconnecting and removing the entire end closure of the reactor.

The following specific examples are set forth for the purpose of illustrating the present invention and should not be construed to limit the invention to the precise ingredients and proportions shown.

*Example I*

The liquid phase reactants comprising a solution of 85% by volume aniline and 15% by volume dicyclohexylamine are fed continuously into the high pressure reactor 10 by means of a proportioning pump through the regenerative heat exchanger tube 19 extending from the bottom of the reactor upwardly through the catalyst bed 18 comprised of the commercially available ruthenium supported on activated alumina pellets as described in the preceding paragraphs and into the reactor tube at the top of the catalyst bed initially heated to a reaction temperature of about 216° C. by the strip heaters and under a hydrogen pressure of about 750 lbs. per square inch. The hydrogen is continuously supplied to the reactor through a manifold system and pressure control valve at the bottom of the reactor tube and the gaseous hydrogen passes upwardly through the inlet passage 23 and through the bed of catalyst countercurrently to the downflow of aniline and dicyclohexylamine. Approximately three mols of hydrogen are used per mol of aniline. The aniline-dicyclohexylamine solution is fed at a flow rate of 438 cc. per hour which corresponds to a space velocity of about 0.88 volume of aniline per volume of catalyst per hour. A yield of 82% by weight cyclohexylamine having a refractive index of 1.4565 at 25° C. is obtained by fractional isolation of the product stream withdrawn continuously from separator 25 into the product receiver 26, said yield being based on an aniline and dicyclohexylamine additive free basis. The amount of dicyclohexylamine formed in the reaction mixture is 3.6% by weight based on the feed mixture and 8% by weight cyclohexane is formed based on the feed mixture.

*Example II*

The liquid phase reactants comprising a solution of about 80% by volume aniline and about 20% by volume dicyclohexylamine are fed continuously by means of a proportioning pump into the regenerative heat exchanger tube extending from the bottom of the reactor upwardly through the catalyst bed having the composition described in the preceding example and into the reactor tube at the top of the catalyst bed maintained at a temperature of about 220° C. and under a hydrogen pressure of about 750 lbs. per square inch. The hydrogen is continuously supplied to the reactor through a manifold system and pressure control valve to the bottom of the reactor tube and the gaseous hydrogen passes upwardly through the bed of catalyst countercurrently to the downflow of aniline and dicyclohexylamine. Approximately three mols of hydrogen are used per mol of aniline. The aniline-dicyclohexylamine solution has a flow rate of 438 cc. per hour which corresponds to a space velocity of about 0.88 volume of aniline per volume of catalyst per hour. A yield of 81.6% by weight cyclohexylamine having a refractive index of 1.4565 at 25° C. is obtained by fractional isolation of the product stream, withdrawn continuously from separator 25 into the product receiver 26, said yield being based on an aniline and dicyclohexylamine additive free basis. The amount of dicyclohexylamine formed in the reaction mixture is 3% by weight based on the feed mixture and 8.6% by weight cyclohexane is formed based on the feed mixture.

*Example III*

Aniline is fed continuously by means of a proportioning pump into the regenerative heat exchanger tube extending from the bottom of the reactor upwardly through the catalyst bed having the composition described in Example I and into the reactor tube at the top of the catalyst bed maintained at a temperature of about 230° C. and under a hydrogen pressure of about 750 lbs. per square inch.

The hydrogen is continuously supplied to the reactor through a manifold system and pressure control valve to the bottom of the reactor tube and the gaseous hydrogen passes upwardly through the bed of catalyst countercurrently to the downflow of aniline. Approximately three mols of hydrogen are used per mol of aniline. The aniline stream has a flow rate of 449 cc. per hour which corresponds to a space velocity of about 0.90 volume of aniline per volume of catalyst per hour. A yield of 63.8% by weight cyclohexylamine having a refractive index of 1.4565 at 25° C. is obtained by fractional isolation of the product stream, withdrawn continuously from separator 25 into the product receiver 26, said yield being based on an aniline free basis. The amount of dicyclohexylamine formed in the reaction mixture is 19.8% by weight based on the aniline feed and 13.2% by weight cyclohexane is produced based on the aniline feed.

*Example IV*

The liquid phase reactants comprising a solution of 85% by volume aniline and 15% by volume dicyclohexylamine are fed continuously by means of a proportioning pump into the regenerative heat exchanger tube extending from the bottom of the reactor upwardly through the catalyst bed having the composition described in Example I and into the reactor tube at the top of the catalyst bed maintained at a tempertaure of about 220° C. and under a hydrogen pressure of about 600 lbs. per square inch. The hydrogen is continuously supplied to the reactor through a manifold system and pressure control valve to the bottom of the reactor tube and the gaseous hydrogen passes upwardly through the bed of catalyst countercurrently to the downflow of aniline and dicyclohexylamine. Approximately three mols of hydrogen are used per mol of aniline. The aniline-dicyclohexylamine solution has a flow rate of 438 cc. per hour which corresponds to a space velocity of about 0.88 volume of aniline per volume of catalyst per hour. A yield of 80.5% by weight cyclohexylamine is obtained by fractional isolation of the product stream, withdrawn continuously from separator 25 into the product receiver 26, said yield being based on an aniline and dicyclohexylamine additive free basis. The amount of dicyclohexylamine formed in the reaction mixture is 4% by weight based on the feed mixture and 8.8% by weight cyclohexane is formed based on the feed mixture.

*Example V*

Aniline is fed continuously by means of a proportioning pump into the regenerative heat exchanger tube extending from the bottom of the reactor upwardly through the catalyst bed having the composition described in Example I and into the reactor tube at the top of the catalyst bed maintained at a temperature of about 245° C. and under a hydrogen pressure of about 600 lbs. per square inch. The hydrogen is continuously supplied to the reactor through a manifold system and pressure control valve to the bottom of the reactor tube and the gaseous hydrogen passes upwardly through the bed of catalyst countercurrently to the downflow of aniline. Approximately three mols of hydrogen are used per mol of aniline. The aniline solution has a flow rate of 484 cc. per hour which corresponds to a space velocity of about 0.97 volume of aniline per volume of catalyst per hour. A yield of 68.6% by weight cyclohexylamine is obtained by fractional isolation of the product stream, withdrawn continuously from separator 25 into the product receiver 26, said yield being based on an aniline free basis. The amount of dicyclohexylamine formed in the reaction mixture is 16% based on the aniline feed and 12.4% by weight cyclohexane is formed based on the aniline feed.

*Example VI*

The liquid phase reactants comprising a solution of 98.5% by volume aniline and 1.5% ammonia are fed continuously by means of a proportioning pump into the regenerative heat exchanger tube extending from the bottom of the reactor upwardly through the catalyst bed having the composition described in Example I and into the reactor tube at the top of the catalyst bed maintained at a temperature of about 218° C. and under a hydrogen pressure of about 600 lbs. per square inch. The hydrogen is continuously supplied to the reactor through a manifold system and pressure control valve to the bottom of the reactor tube and the gaseous hydrogen passes upwardly through the bed of catalyst countercurrently to the downflow of aniline and ammonia. Approximately three mols of hydrogen are used per mol of aniline. The aniline-ammonia solution has a flow rate of 449 cc. per hour which corresponds to a space velocity of about 0.90 volume of aniline per volume of catalyst per hour. A yield of 70.5% by weight cyclohexylamine is obtained by fractional isolation of the product stream, withdrawn continuously from separator 25 into the product receiver 26, said yield being based on an aniline free basis. The amount of dicyclohexylamine formed in the reaction mixture is 16.7% by weight based on the feed mixture and 6.7% by weight cyclohexane is formed based on the feed mixture.

*Example VII*

The liquid phase reactants comprising a solution of 85% by volume aniline and 15% by volume dicyclohexylamine are fed continuously by means of a proportioning pump into the said regenerative heat exchanger tube extending from the bottom of the reactor upwardly through the catalyst bed having the composition described in Example I and into the reactor tube at the top of the catalyst bed maintained at a temperature of about 225° C. and under a hydrogen pressure of about 750 lbs. per square inch. The hydrogen is continuously supplied to the reactor through a manifold system and pressure control valve to the bottom of the reactor tube and the gaseous hydrogen passes upwardly through the bed of catalyst countercurrently to the downflow of aniline and dicyclohexylamine. Approximately three mols of hydrogen are used per mol of aniline. The aniline-dicyclohexylamine solution has a relatively high flow rate of 1060 cc. per hour which corresponds to a space velocity of about 2.12 volumes of aniline per volume of catalyst per hour. Once the reaction is initiated, the strip heaters are turned off as the reaction is exothermic and maintains the reactor at the said reaction temperature as long as the reactants are fed at the specified rate of flow. A yield of 77.6% by weight of cyclohexylamine is obtained by fractional isolation of the product stream, withdrawn continuously from separator 25 into the product receiver 26, said yield being based on an aniline and dicyclohexylamine additive free basis. The amount of dicyclohexylamine formed in the reaction mixture is 7.3% by weight based on the feed mixture and 5.7% by weight cyclohexane.

*Example VIII*

Aniline is fed continuously by means of a proportioning pump into the regenerative heat exchanger tube extending from the bottom of the reactor upwardly through the catalyst bed having the composition described in Example I and into the reactor tube at the top of the catalyst bed maintained at a temperature of about 235° C. and under a hydrogen pressure of about 510 lbs. per square inch. The hydrogen is continuously supplied to the reactor through a manifold system and pressure control valve to the bottom of the reactor tube and the gaseous hydrogen passes upwardly through the bed of catalyst countercurrently to the downflow of aniline. Approximately three mols of hydrogen are used per mol of aniline. The aniline has a flow rate of 506 cc. per hour which corresponds to a space velocity of about 1.01 volumes of aniline per volume of catalyst per hour. A yield of 70.2% by weight of cyclohexylamine having a refractive index of 1.4565 at 25° C. is obtained by fractional isolation of the product stream, withdrawn continuously from separator 25 into the product receiver 26, said yield being based on an aniline free basis. The amount of dicyclohexylamine formed in the reaction mixture is 12.4% by weight based on the aniline feed and 12.7% by weight cyclohexane is formed based on the aniline feed.

*Example IX*

Aniline is fed continuously by means of a proportioning pump into the regenerative heat exchanger tube extending from the bottom of the reactor upwardly through the catalyst bed having the composition described in Example I and into the reactor tube at the top of the catalyst bed maintained at a temperature of about 220° C. and under a hydrogen pressure of about 600 lbs. per square inch. The hydrogen is continuously supplied to the reactor through a manifold system and pressure control valve to the bottom of the reactor tube and the gaseous hydrogen passes upwardly through the bed of catalyst countercurrently to the downflow of aniline. Approximately three mols of hydrogen are used per mol of aniline. The aniline has a flow rate of 484 cc. per hour which corresponds to a space velocity of about 0.97 volume of aniline per volume of catalyst per hour. A yield of 76% by weight of cyclohexylamine having a refractive index of 1.4565 at 25° C. is obtained by fractional isolation of the product stream, withdrawn continuously from separator 25 into the product receiver 26, said yield being based on an aniline free basis. The amount of dicyclohexylamine formed in the reaction mixture is 11.3% by weight based on the aniline feed and 6.8% by weight cyclohexane is formed based on the aniline feed.

*Example X*

Aniline is fed continuously by means of a proportioning pump into the regenerative heat exchanger tube extending from the bottom of the reactor upwardly through the catalyst bed having the composition described in Example I and into the reactor tube at the top of the catalyst bed maintained at a temperature of about 203° C. and under a hydrogen pressure of about 1000 lbs. per square inch. The hydrogen is continuously supplied to the reactor through a manifold system and pressure control valve to the bottom of the reactor tube and the gaseous hydrogen passes upwardly through the bed of catalyst counter-currently to the downflow of aniline. Approximately three mols of hydrogen are used per mol of aniline. The aniline has a flow rate of 429 cc. per hour which corresponds to a space velocity of about 0.97 volume of aniline per volume of catalyst per hour. A yield of 74.2% by weight of cyclohexylamine having a refractive index of 1.4565 at 25° C. is obtained by fractional isolation of the product stream, withdrawn continuously from separator 25 into the product receiver 26, said yield being based on an aniline free basis. The amount of dicyclohexylamine formed in the reaction mixture is 14.4% by weight based on the aniline feed and 9.4% by weight cyclohexane is formed based on the aniline feed.

*Example XI*

Liquid p-toluidine is fed continuously by means of a proportioning pump into the regenerative heat exchanger tube extending from the bottom of the reactor upwardly through the catalyst bed having the composition described in Example I and into the reactor tube at the top of the catalyst bed maintained at a temperature of about 250–260° C. and under a hydrogen pressure of about 1000 lbs. per square inch. The hydrogen is continuously supplied to the reactor through a manifold system and pressure control valve to the bottom of the reactor tube and the gaseous hydrogen passes upwardly through the bed of catalyst countercurrently to the downflow of p-toluidine. Approximately three mols of hydrogen are used per mol of p-toluidine. The p-toluidine has a flow rate of 490 cc. per hour which corresponds to a space velocity of about 0.98 volume of p-toluidine per volume of catalyst per hour. A yield of 86% by weight of 4-methyl cyclohexylamine having a refractive index of 1.4525 at 25° C. is obtained by fractional isolation of the product stream, withdrawn continuously from separator 25 into the product receiver 26, said yield being based on a p-toluidine free basis.

*Example XII*

Liquid diphenylamine is fed continuously by means of a proportioning pump into the regenerative heat exchanger tube extending from the bottom of the reactor upwardly through the catalyst bed having the composition described in Example I and into the reactor tube at the top of the catalyst bed maintained at a temperature of about 220° C. and under a hydrogen pressure of about 800 lbs. per square inch. The hydrogen is continuously supplied to the reactor through a manifold system and pressure control valve to the bottom of the reactor tube and the gaseous hydrogen passes upwardly through the bed of catalyst countercurrently to the downflow of diphenylamine. Approximately six mols of hydrogen are used per mol of diphenylamine. The diphenylamine has a flow rate of 475 cc. per hour which corresponds to a space velocity of about 0.96 volume of diphenylamine per volume of catalyst per hour. A yield of 82% by weight of dicyclohexylamine having a refractive index of 1.4823 at 25° C. is obtained by fractional isolation of the product stream, withdrawn continuously from separator 25 into the product receiver 26, said yield being based on a diphenylamine free basis.

While the preferred ruthenium catalyst used in the present invention is ruthenium metal in a finely divided form supported on activated aluminum pellets as described heretofore, it is also possible to disperse the ruthenium on charcoal, kieselguhr, or other insert carrier in granular, pelleted, ball, or other fabricated shapes. The ruthenium can be in the elementary form as in the preferred embodiment, as ruthenium oxide or dioxide, or as a salt of ruthenium with ruthenium in either the anion or the cation thereof, in accordance with the teaching of the prior art use of noble metal catalysts.

The ruthenium content of the catalyst used can, of course, be varied widely depending upon the conditions employed in the reaction tube and while it is preferred to use a ruthenium catalyst comprising approximately 0.5% ruthenium, variations between about 0.005 and 10% by weight ruthenium catalyst can be effectively employed.

The reaction temperatures employed in the present invention vary between about 200 and 250° C. with the preferred temperature of 220° C. being employed for the continous conversion of aniline to cyclohexylamine. The particular temperature employed depends upon the type of material being hydrogenated and the rate of conversion. When temperatures in excess of approximately 250° C. are employed, however, it is observed that side reaction products form in excess and it is preferred to maintain reaction temperatures below about 250° C. Temperatures below 200° C. cannot be successfully used.

The continuous process of the present invention can be carried out with the herein disclosed apparatus at pressures ranging between about 250 lbs. per square inch and 3000 lbs. per square inch with the preferred reaction in which aniline is converted to cyclohexylamine being effected at a pressure of at least about 500 lbs. per square inch. Higher pressures, up to and including about 10,000 lbs. per square inch, can be employed without interfering with the reaction depending upon the apparatus available.

The rate of flow or space velocity of the amine compound through the reactor can be varied over a considerable range (viz. 0.5 to 3.5 volume of feed per hour per volume of catalyst, although higher rates of flow can be used if additional cooling is employed) with generally an improved overall output per reactor when the higher flow rate is used despite a slightly lower percentage of conversion of the feed directly to cyclohexylamine. Thus, with a high flow rate (space velocity) the amount of the desired product produced per hour is substantially greater than at the lower rate of feed despite the somewhat improved efficiency at the lower feed rate. Moreover, a substantial proportion of the side reaction product formed at the higher feed rate and the unconverted feed can be recycled and is not lost to the system. The most satisfactory rate of flow or space velocity for the feed can be readily determined for a given apparatus by equilibrating the output of product with the higher cost of providing the necessary cooling to maintain the temperatures within the desired range at the higher rates of feed and the higher cost of recovering the unconverted feed and reusable side reaction products from the product stream, with the further essential limitation, of course, that there must be in every instance, a rate of flow which permits sufficient time to elapse for the reaction to take place within the reaction tube.

While the process of the present invention is particularly suitable for the preparation of cyclohexylamine from aniline, other amino aromatic compounds can also be used in the process including benzidine, toluidine, n-methyl aniline, n-dimethyl aniline, diphenylamine, phenylenediamine, and triphenylamine. Other aromatic compounds having a nitrogen directly attached to an aromatic carbon atom can also be employed in the process of the present invention without departing from the broad invention disclosed herein.

This application is a divisional application of our co-pending application Serial No. 457,020, filed September 20, 1954, and now U.S. Patent No. 2,822,392.

Others may readily adapt the invention for use under various conditions of service, by employing one or more of the novel features disclosed or equivalents thereof. As at present advised with respect to the apparent scope of our invention, we desire to claim the following subject matter.

We claim:

In an apparatus for conducting high pressure corrosive chemical reactions which include a reaction chamber having an end section with at least one aperture therethrough, and a regenerative heat exchanger tube removably disposed in the said aperture and extending into the interior of said chamber, an improved regenerative heat exchanger tube assembly forming a readily detachable sealing engagement with the said reaction chamber comprising, a regenerative heat exchanger tube and a tubular adapter member detachably mountable in said end section, said adapter member having an axial passage therethrough with the outer end thereof adapted to engage a conduit conveying at least one of said reactants through said axial passage of said adapter and said heat exchange tube to the reaction chamber, the inner end of said adapter having an enlarged end section, said enlarged end section being provided with a shoulder spaced from the end thereof and having at the forward end thereof a tapered outer bearing surface, said end section also having a recessed surface in the forward end in which the said heat exchanger tube is detachably secured, said aperture in the end section of the reaction chamber having a tapered wall portion on the outer surface thereof adapted to receive the correspondingly tapered portion of the said adapter member, and a gland nut forming a detachable engagement with the said end section of the reaction chamber and also forcibly engaging the shoulder of the said adapter member so that the adapter member forms a sealing engagement with both the reaction chamber and the said heat exchanger tube, said tapered portion of the adapter member firmly engaging the outer walls of the said heat exchanger tube forming a sealing engagement therewith.

References Cited in the file of this patent

UNITED STATES PATENTS

| 1,848,466 | Edwards | Mar. 8, 1932 |
| 1,893,492 | Brill | Jan. 10, 1933 |

FOREIGN PATENTS

| 643,923 | France | May 22, 1928 |

OTHER REFERENCES

American Instrument Co., catalogue 406, 1943 edition, page 18.